US012654761B2

(12) United States Patent
Shin

(10) Patent No.: US 12,654,761 B2
(45) Date of Patent: Jun. 16, 2026

(54) ELECTRIC POWER STEERING APPARATUS

(71) Applicant: HL MANDO CORPORATION,
Pyeongtaek-si (KR)

(72) Inventor: Woong Soo Shin, Seoul (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 856 days.

(21) Appl. No.: 17/899,614

(22) Filed: Aug. 31, 2022

(65) Prior Publication Data

US 2023/0085265 A1 Mar. 16, 2023

(30) Foreign Application Priority Data

Sep. 15, 2021 (KR) ........................ 10-2021-0123426

(51) Int. Cl.
B62D 5/04 (2006.01)
B62D 3/12 (2006.01)
(52) U.S. Cl.
CPC ........... B62D 5/0445 (2013.01); B62D 3/126
(2013.01)
(58) Field of Classification Search
CPC .... B62D 3/126; B62D 5/0424; B62D 5/0445;
B62D 5/0451
USPC ........................................................ 180/444
See application file for complete search history.

(56) References Cited

FOREIGN PATENT DOCUMENTS

DE 102018209820 A1 * 12/2019 ........... B62D 5/0451
EP 1110845 A1 * 6/2001 ........... B62D 5/0451
JP 2001-219856 8/2001

OTHER PUBLICATIONS

Office Action dated Mar. 4, 2026 for Korean Patent Application No.
10-2021-0123426 and its English translation from Global Dossier.

* cited by examiner

*Primary Examiner* — Valentin Neacsu
*Assistant Examiner* — Felicia L. Brittman-Alabi
(74) *Attorney, Agent, or Firm* — WOMBLE BOND
DICKINSON (US) LLP

(57) ABSTRACT

An electric power steering apparatus includes: a pinion shaft connected to a steering shaft coupled to a steering wheel, the pinion shaft being configured to transmit an operation of the steering wheel by a driver; a rack bar elongated along a lateral direction of a vehicle, having a first screw recess defined with a predetermined length in a portion of an outer circumferential surface of the rack bar, and including, on one side, a rack gear coupled to and interlocked with the pinion shaft; a motor configured to generate a steering assist power in proportion to a steering torque applied to the steering wheel; and a roller screw unit rotatably engaged with and coupled to the first screw recess to transmit the steering assist power generated from the motor to the rack bar.

9 Claims, 9 Drawing Sheets

ELECTRIC POWER STEERING APPARATUS

CROSS-REFERENCE TO RELATED APPLICATION

This application claims priority under 35 U.S.C. § 119 to Korean Patent Application No. 10-2021-0123426, filed on Sep. 15, 2021, in the Korean Intellectual Property Office (KIPO), the disclosure of which is incorporated by reference herein in its entirety.

1. TECHNICAL FIELD

Embodiments of the present disclosure relate to an electric power steering apparatus, and more particularly, to an electric power steering apparatus applying a screw when transmitting a steering assist power generated from a motor to a rack bar, thereby being improved in terms of bearing capacity, durability, and precision.

2. DISCUSSION OF RELATED ART

As a power-assisted steering system of a vehicle, hydraulic power steering apparatuses using a hydraulic pressure of a hydraulic pump are generally used, but recently, electric power steering apparatuses using a motor has become common gradually.

A general electric power steering system includes a steering system extending from a steering wheel to opposite wheels and an assist power mechanism for supplying a steering assist power to the steering system.

FIG. 1 schematically illustrates a general rack-driven power-assisted steering system. As illustrate in FIG. 1, a general rack-driven power-assisted steering system includes a steering system leading from a steering wheel 11 to opposite wheels 15b and a power assist device 16 for supplying a steering assist power to the steering system.

The steering system includes a steering shaft 10 including an upper end connected to the steering wheel 11 and rotating together with the steering wheel 11, and a lower end connected to a pinion shaft 12 via a pair of universal joints 15. In addition, the pinion shaft 12 is connected to a rack bar 15a through a rack-pinion mechanism, and opposite ends of the rack bar 15a are connected to the wheel 15b of a vehicle through a tie rod and a knuckle arm.

The rack-pinion mechanism is formed as a pinion gear 12a formed at a lower end of the pinion shaft 12 is engaged with a rack gear 13 formed on one side of an outer circumferential surface of the rack bar 15a.

The power assist device 16 includes a torque sensor 17 for detecting a steering torque applied by a driver to the steering wheel 11 and outputting an electric signal proportional to the detected steering torque, an electronic control unit (ECU) for generating a control signal based on the electric signal transmitted from the torque sensor 17, a motor 16a for generating a steering assist power based on a control signal transmitted from the electronic control unit, and a power assist device 17 for transmitting an assist power generated from the motor 16a to the rack bar 15a via a belt.

Meanwhile, in the related art, the assist power generated from the power assist device was transmitted to the rack bar through a configuration called a ball nut. The ball nut includes a ball that rolls through a screw recess defined in the rack bar. However, the method of providing such a ball nut has a complicated structure and inevitably increases the size and weight.

Moreover, since the balls move in a rolling manner without maintaining a uniform distance, there was a problem that the balls collide with each other and make noise while moving.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present disclosure may be directed to an electric power steering apparatus improved in terms of bearing capacity, durability, and precision by applying a screw when transmitting a steering assist power generated from a motor to a rack bar.

According to an embodiment, an electric power steering apparatus includes: a pinion shaft connected to a steering shaft coupled to a steering wheel, the pinion shaft being configured to transmit an operation of the steering wheel by a driver; a rack bar elongated along a lateral direction of a vehicle, having a first screw recess defined with a predetermined length in a portion of an outer circumferential surface of the rack bar, and including, on one side, a rack gear coupled to and interlocked with the pinion shaft; a motor configured to generate a steering assist power in proportion to a steering torque applied to the steering wheel; and a roller screw unit rotatably engaged with and coupled to the first screw recess to transmit the steering assist power generated from the motor to the rack bar.

In some embodiments, the roller screw unit may include: a plurality of screw members rotatably engaged with the first screw recess and are spaced apart from each other by a predetermined angle along a circumferential direction of the rack bar; a positioning member having a hollow defined along a longitudinal direction such that the rack bar is insertable through the positioning member, the positioning member being configured to fix a position of the screw members such that the screw members are rotatable only at a predetermined position; and a housing having a hollow defined along a longitudinal direction such that the positioning member and the rack bar are insertable through the housing, the housing being configured to protect the plurality of screw members and the positioning member and prevent the plurality of screw members from being separated from the positioning member.

In some embodiments, in a body of the positioning member, a positioning hole may be defined through inner and outer surfaces of the body, and the positioning hole may include a plurality of positioning holes spaced apart from each other by a predetermined angle along a circumferential direction of the body.

In some embodiments, when the rack bar and the positioning member are coupled to each other, the first screw recess may be exposed, and the screw members may be respectively disposed at the positioning holes such that the first screw recess and the screw member are engaged.

In some embodiments, in the body of the positioning member, a separation prevention projection radially protruding from the body of the positioning member may be formed between one of the positioning holes and another adjacent one of the positioning holes, and after the screw members are respectively disposed in the positioning holes, the separation prevention projection may prevent the screw members from being separated to another place.

In some embodiments, a separation prevention ring configured to prevent the screw member disposed in the positioning hole from being separated in a longitudinal direction of the rack bar may be further formed extending on longitudinally opposite ends of the body of the positioning member.

In some embodiments, the roller screw unit may include: a plurality of screw members rotatably engaged with the first screw recess, and spaced apart from each other by a predetermined angle along a circumferential direction of the rack bar; and a casing having a hollow defined along a longitudinal direction such that the rack bar and the plurality of the screw members are insertable through the casing, the casing being configured to prevent the plurality of the screw members from being separated from the rack bar, while protecting the rack bar and the plurality of screw members.

In some embodiments, the screw member may include: a plurality of main screws rotatably engaged with the first screw recesses and spaced apart from each other by a predetermined interval in a longitudinal direction of the rack bar; a connection screw having one side connected to one of the main screws, and another side connected to another of the main screws; and a support shaft formed at a free end of the main screw disposed on the one side and a free end of the main screw located on the another side.

In some embodiments, in an inner circumferential surface of the body of the casing, a plurality of positioning recesses may be defined concavely along a radial direction to determine a position of the main screw, and spaced apart from each other by a predetermined interval along a longitudinal direction of the body of the casing.

In some embodiments, a coupling recess may be defined in an inner circumferential surface of the body of the casing between one of the positioning recesses and another of the positioning recesses in a longitudinal direction of the casing, such that the connection screw is engagable with the coupling recess.

In some embodiments, the roller screw unit may further include: a casing cover coupled to longitudinally opposite sides of the casing, and coupled to the screw member to secure a position of the screw member such that the screw member is rotatable only at a predetermined position.

In some embodiments, a coupling projection may be formed on one side of an outer circumferential surface of the casing cover, the coupling projection protruding along a radial direction and extending along a circumferential direction.

In some embodiments, in the casing, a coupling projection insertion recess concaved along a radial direction and extending along a circumferential direction may be defined in an inner circumferential surface of the casing such that the coupling projection is inserted and coupled to the coupling projection insertion recess, the coupling projection insertion recess being spaced apart from longitudinally opposite sides of the casing by a predetermined distance.

The electric power steering apparatus according to the present disclosure has the following effects.

First, the roller screw unit coupled to the first screw thread of the rack bar includes the screw member rotatable while being engaged with the first screw thread, and the first screw thread and the screw member are rotated in an engaged state with a uniform force, thereby improving the bearing capacity (e.g., support capacity).

Second, with the uniform and improved bearing capacity, noise may be improved during rotation of the first screw thread and the screw member.

Third, the degree of precision of control may be improved by using a pitch interval between the first screw thread and the screw member.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation according to an embodiment will become more apparent by describing in detail embodiments thereof with reference to the accompanying drawings, wherein.

DETAILED DESCRIPTION

Figure 1:
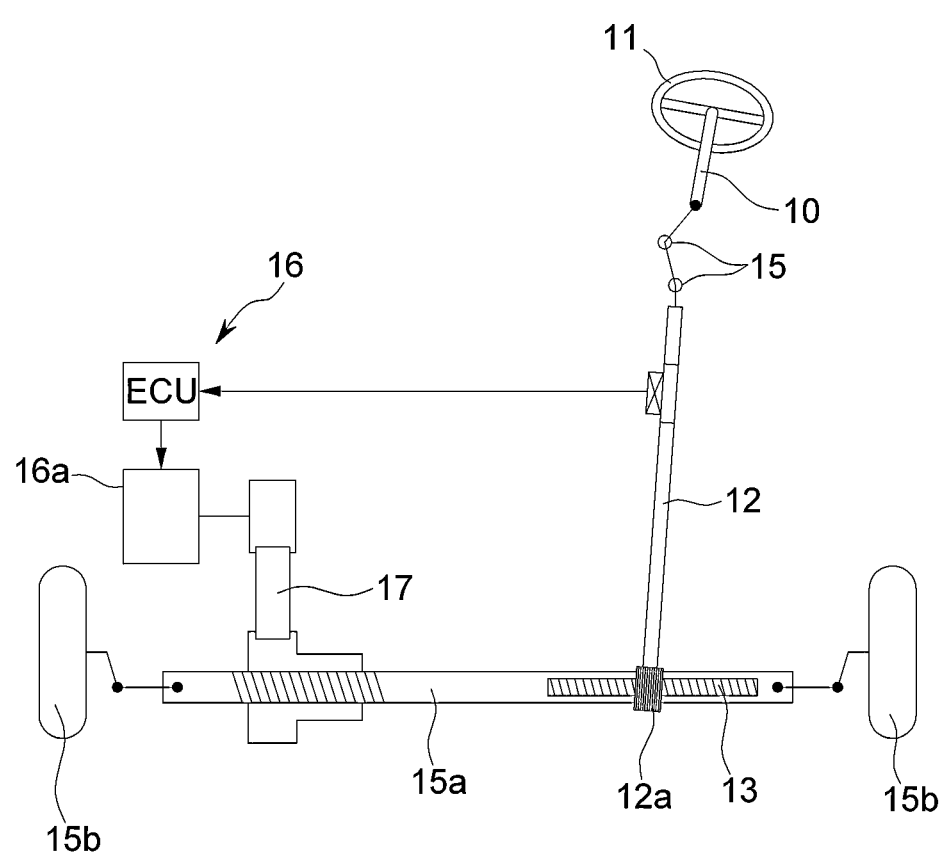
FIG. 1 is a schematic view illustrating a conventional rack-driven power-assisted steering apparatus.
Figure 2:
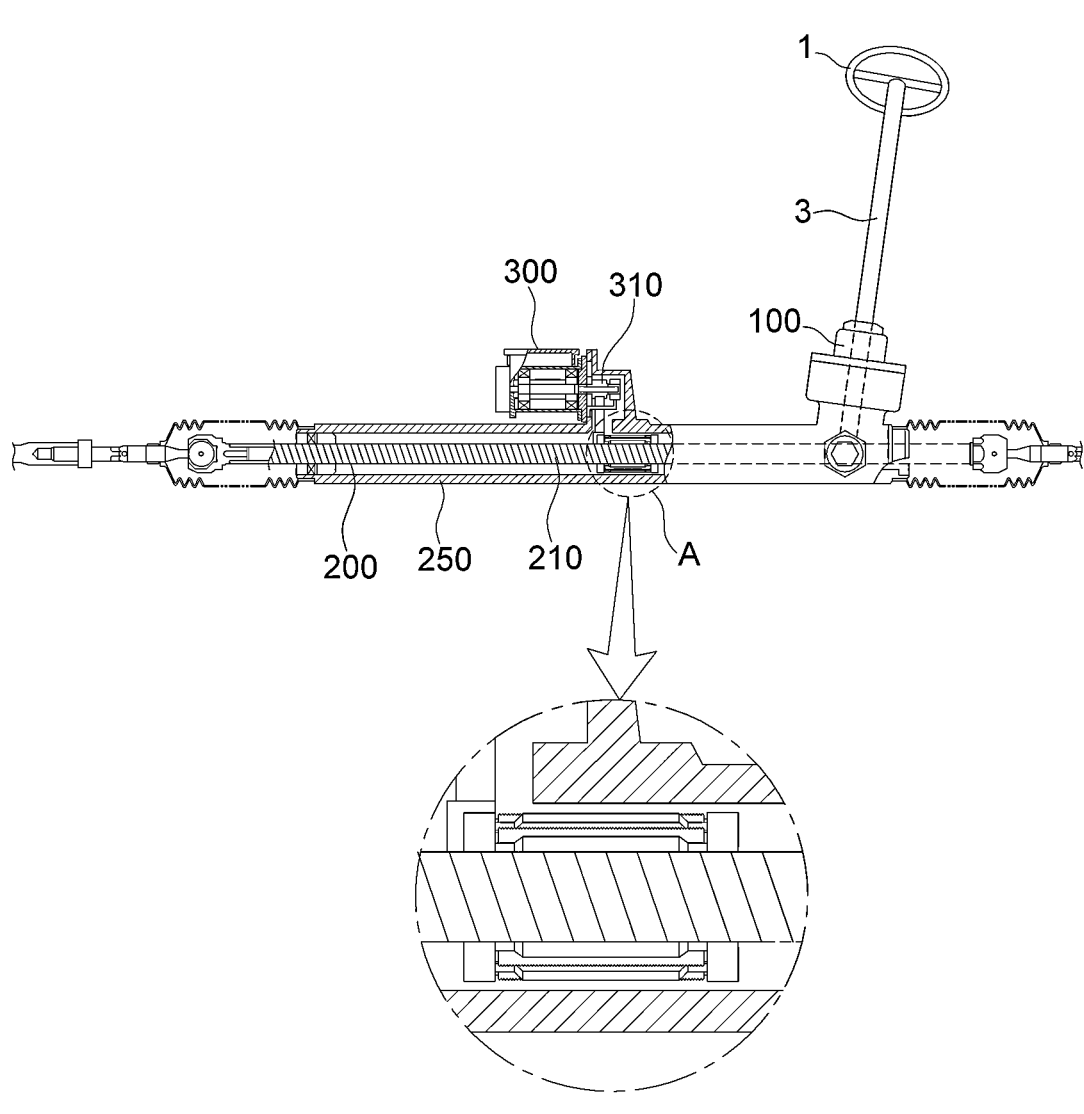
FIG. 2 is a schematic view illustrating an electric power steering apparatus according to an embodiment of the present disclosure.

Hereinafter, with reference to the accompanying drawings, embodiments of the present disclosure will be described in detail so that those of ordinary skill in the art to which the present disclosure pertains would easily implement them. The present disclosure may be embodied in many different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and any dimensions are illustrative only and not limiting. The same reference numerals are used to indicate like features to the same structural element or part in two or more drawings.

The embodiment of the present disclosure specifically represents an ideal embodiment of the present disclosure. As a result, various modifications of the drawings are expected. Accordingly, the embodiment is not limited to a specific shape of the illustrated area, and includes, for example, a shape modification by manufacturing.

An electric power steering apparatus according to an embodiment of the present disclosure includes a pinion shaft 100, a rack bar 200, a motor 300, and a roller screw unit 400.

The pinion shaft 100 is connected to a steering shaft 3 coupled to a steering wheel 1. The steering wheel 1 is a steering wheel (e.g., a handle bar) directly operated by a driver. When the steering wheel 1 is operated by the driver, a driving operation of the steering wheel 1 is transmitted to the pinion shaft 100 through the steering shaft 3.

The rack bar 200 is elongated in length along a width direction of the vehicle, and a first screw recess 210 is defined in a portion of an outer circumferential surface of the rack bar 200 by a predetermined length. A rack gear (not illustrated) is provided on one side of the rack bar 200 to interlock with the pinion shaft 100.

As described above, the first screw recess 210 of the predetermined length is defined in the outer circumferential surface of the rack bar 200, and the rack bar 200 is embedded in a rack housing 250.

The motor 300 generates a steering assist power in proportion to a steering torque applied to the steering wheel 10. The steering assist power generated from the motor 300 is transmitted to the rack bar 200 through the roller screw unit 400.

The motor shaft 310 of the motor 300 is connected to the roller screw unit 400 through a belt (not illustrated). That is, the steering assist power is transmitted to the roller screw unit 400 by the belt (not illustrated).

The roller screw unit 400 transmits, to the rack bar 200, the steering assist power transmitted through the belt (not illustrated), and to this end, it is rotatably engaged with the first screw recess 210 defined in the rack bar 200.

Figure 3:
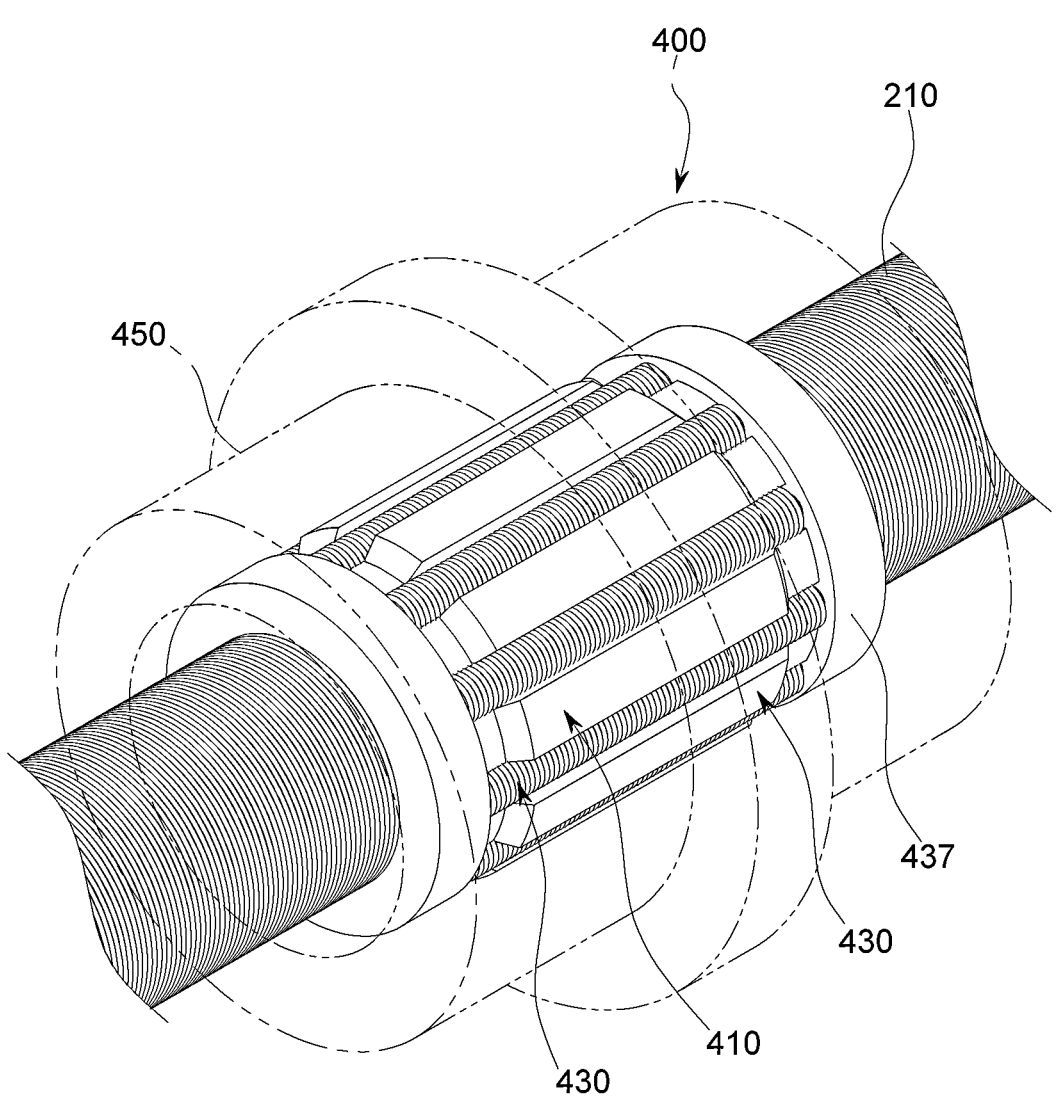
FIG. 3 is a perspective view illustrating a roller screw unit of an electric power steering apparatus according to an embodiment of the present disclosure.
Figure 4:
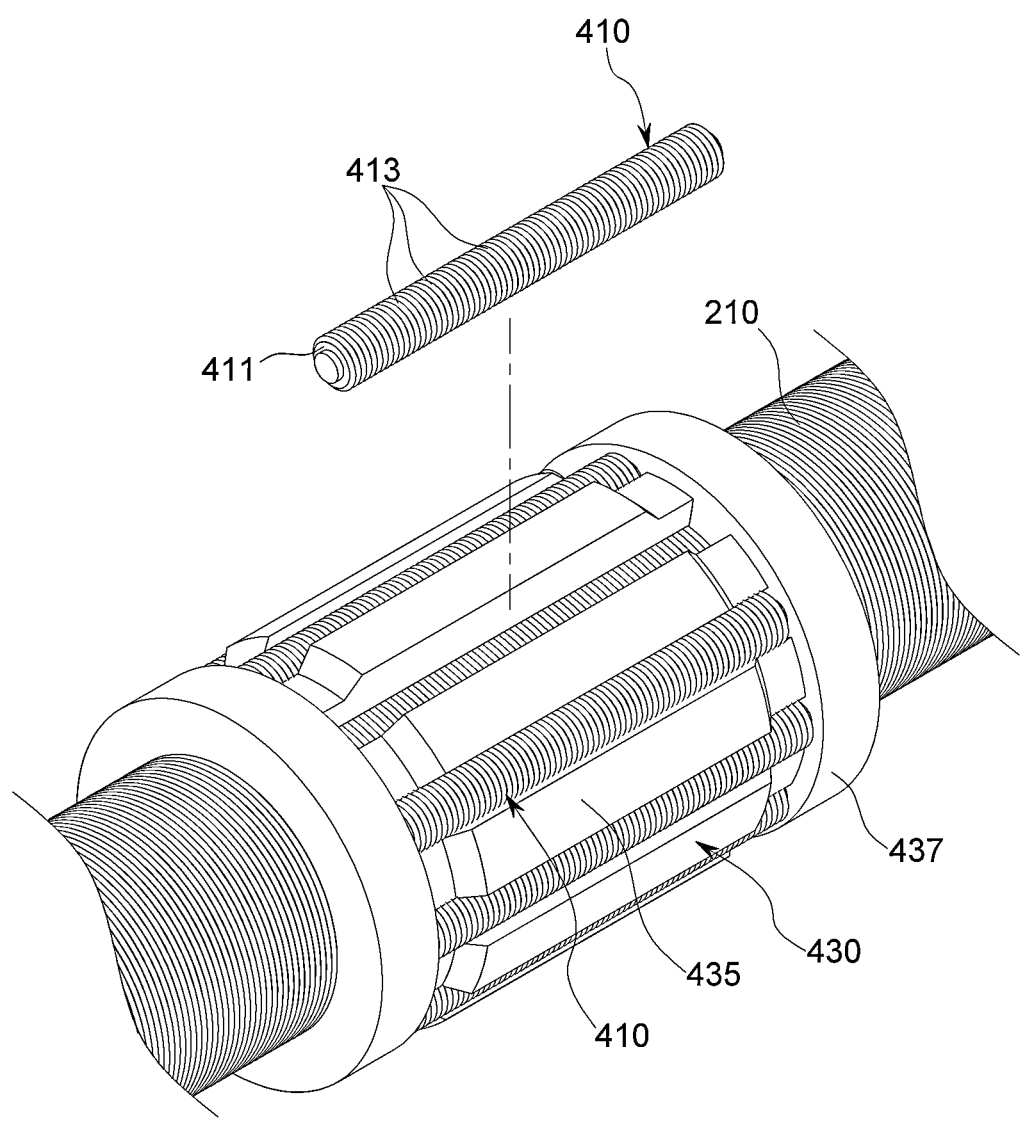
FIG. 4 is a partially exploded perspective view illustrating the roller screw unit of FIG. 3.
Figure 5:
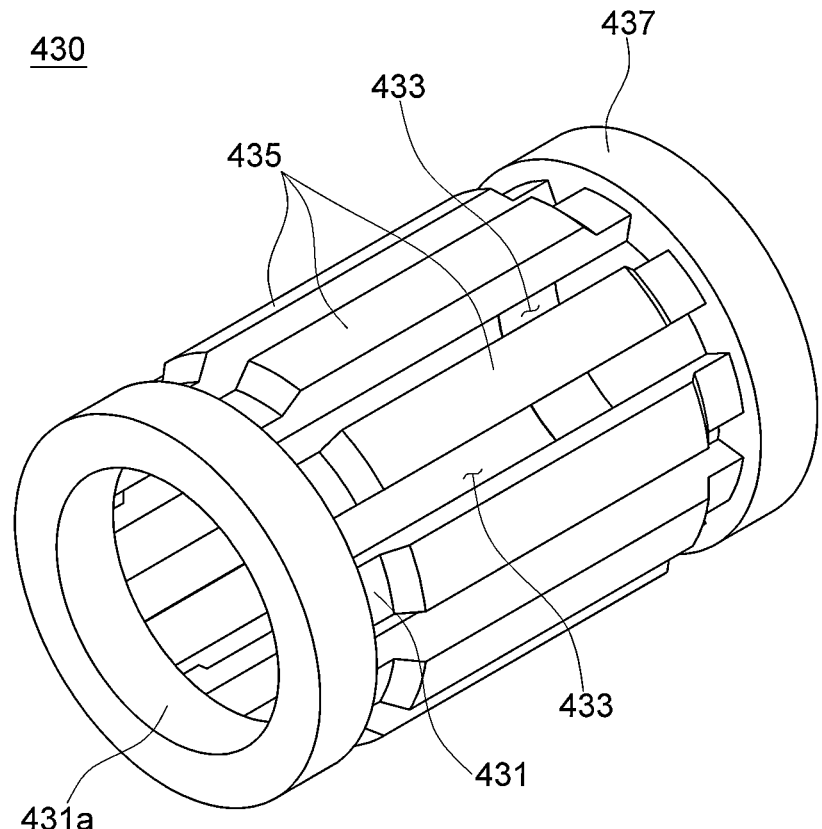
FIG. 5 is a perspective view illustrating a positioning member of the roller screw unit of FIG. 3.

FIGS. 3 to 5 illustrate the roller screw unit 400 according to an embodiment in detail.

The roller screw unit 400 includes a plurality of screw members 410, a positioning member 430, and a housing 450. The screw member 410 is rotatably engaged with the first screw recess 210. In the present embodiment, as illustrate in FIGS. 3 and 4, A plurality of screw members 410 are disposed to be spaced apart from each other by a predetermined angle along a circumferential direction of the rack bar 200.

The screw member 410 includes a cylindrical body 411 as illustrate in FIG. 4. A second screw recess 413 is defined in an outer circumferential surface of the body 411 to a length of the screw member 410. The second screw recess 413 is engaged with the first screw recess 210 such that the screw member 410 may be rotatable.

The screw member 410 may not be provided in the rack bar 200 solely as the screw member 410. The screw member 410 is provided on the rack bar 200 by the positioning member 430.

The positioning member 430 has a hollow 431*a* defined along a longitudinal direction such that the rack bar 200 may be inserted through the positioning member and secures a position of each of the screw members 410 such that each of the screw members 410 may be rotatable only at a predetermined position.

For more detailed description of the positioning member 430 with reference to FIGS. 4 and 5, the positioning member 430 includes a cylindrical body 431. As described above, a hollow 431*a* is defined in the body 431 in the longitudinal direction.

A positioning hole 433 is defined in the body 431. A plurality of positioning holes 433 are spaced apart from each other by a predetermined angle along a circumferential direction of the body 431. Since the positioning hole 433 is defined through inner and outer sides of the body 431, when the rack bar 200 is coupled to the positioning member 430, the first screw recess 210 is exposed through the positioning hole 433.

Since the screw members 410 are provided in the positioning holes 433, respectively, the second screw recess 413 of the screw member 410 and the first screw recess 210 of the rack bar 200 are engaged with each other.

In an embodiment, a separation prevention projection 435 is formed on the body 431 of the positioning member 430. Specifically, the separation prevention projection 435 is formed on an outer circumferential surface of the body 431 between one positioning hole 433 and another adjacent positioning hole 433. The separation prevention projection 435 is formed protruding from the body 431 in a radial direction.

The separation prevention projection 435 prevents the screw members respectively provided in the positioning holes 433 from moving or being separated from one positioning hole 433 they have been arranged (e.g., assigned, disposed, etc.) to another positioning hole 433.

The roller screw unit 400 transmits the steering assist power generated from the motor 300 to the rack bar 200, and in such a case, a rotational motion of the screw member 410 engaged with the first screw recess 210 to rotate is converted into a linear motion of the rack bar 200. Accordingly, as the first screw recess 210 and the screw member 410 are engaged and rotated, the rack bar 200 may perform a reciprocating motion in a horizontal direction.

As described above, the plurality of screw members 410 should be rotated only at positions where the arrangement is determined, but if the separation prevention projection 435 is not provided, one of the screw members 410 may be separated from the arranged positioning hole 433 to collide with or be engaged with another screw member 410, making it difficult to rotate.

This may cause not only failure and damage of the roller screw unit 400 but also failure and damage of the steering apparatus as a whole including the motor 300.

However, in the present embodiment, the separation prevention projection 435 is formed between adjacent positioning holes 433, thereby preventing separation of the screw member 410 and preventing failure and damage of the roller screw unit 400.

A separation prevention ring 437 is further formed at longitudinally opposite ends of the body 431 of the positioning member 430. A size of an outer circumferential surface of the separation prevention ring 437 may be larger than a size of an outer circumferential surface of the body 431. An inner side of the separation prevention ring 437 may be formed to communicate with the hollow 431*a* such that the rack bar 200 may pass through the separation prevention ring 437.

As described above, since the outer circumferential surface of the separation prevention ring 437 is formed larger than the outer circumferential surface of the body 431, the screw members 410 disposed in each of the positioning holes 431 may be prevented from being separated from the positioning member 430 along a longitudinal direction of the rack bar 200.

The housing 450 prevents the screw member 410 from being separated from the positioning member 430, while protecting the screw member 410 and the positioning member 430.

The housing 450 has a hollow (not illustrated) defined such that the rack bar 200 and the positioning member 430 may be inserted through the housing 450 along the longitudinal direction.

The housing 450 is not limited to a specific shape, and it may be formed by applying a known technique.

FIGS. 6 to 9 illustrate a roller screw unit 500 according to another embodiment of the present disclosure, which will be described in detail with reference to the drawings.

A roller screw unit 500 according to another embodiment includes a plurality of screw member 510 and a casing 530.

The screw member 510 is rotatably engaged with the first screw recess 210 defined in the rack bar 200, as in the above-described embodiment. The plurality of the screw members 510 are provided to be spaced apart from each other by a predetermined angle along the circumferential direction of the rack bar 200.

Figure 8:
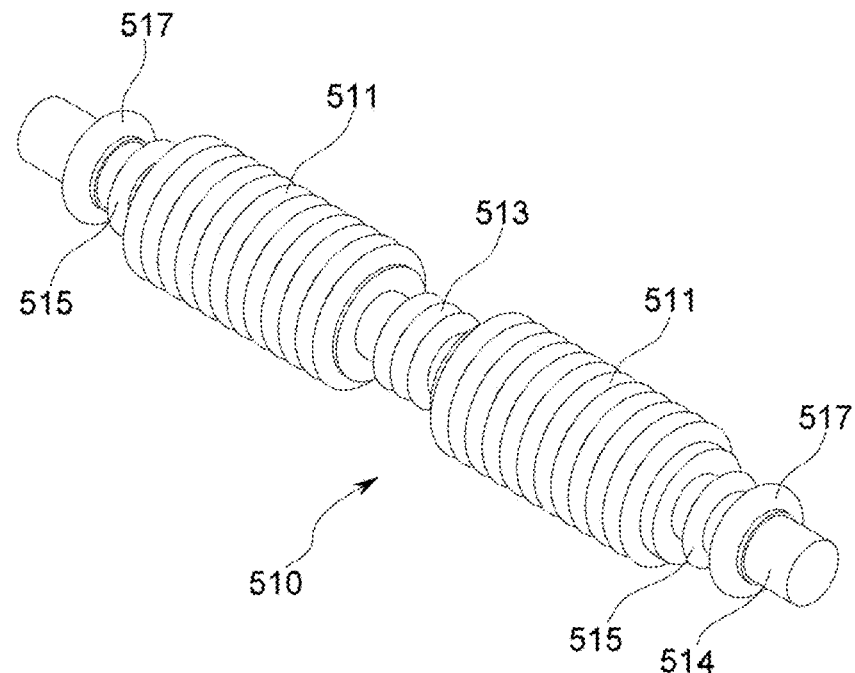
FIG. 8 is a perspective view illustrating a screw member of the roller screw unit of FIG. 6.

Referring to FIG. 8, the screw member 510 includes a plurality of main screws 511, a connection screw 513, a support shaft 514, a securing projection 515, and a locking projection 517.

The main screw 511 includes a cylindrical body (not illustrated), and a third screw recess (not illustrated) in an outer circumferential surface of the body (not illustrated) to be rotatably engaged with the first screw recess 210.

The plurality of main screws 511 are provided to be spaced apart from each other by a predetermined interval along a longitudinal direction of the rack bar 200. In the present embodiment, as illustrate in FIG. 8, two main screws 511 are provided to be spaced apart from each other by a predetermined interval along the longitudinal direction of the rack bar 200.

The connection screw 513 connects one main screw 511 and another adjacent main screw 511. The connection screw 513 also includes a cylindrical body (not illustrated). However, a cross-sectional size of the body of the connection screw 513 is smaller than a cross-sectional size of the body of the main screw 511.

A fourth screw recess (not illustrated) is also defined in an outer circumferential surface of the body of the connection screw 513. As will be described in more detail below, the fourth screw recess (not illustrated) defined in the connection screw 513 is engaged with the casing 530.

The support shaft 514 is connected to each of the main screws 511. Specifically, the support shaft 514 is connected to each of a free end of one main screw 511 and a free end of another main screw 511.

As described above, one side of the one main screw 511 and one side of another main screw 511 are connected to opposite sides of the connection screw 513. Accordingly, the support shaft 514 is connected to another side of the one main screw 511 and another side of the another main screw 511.

As will be described in more detail below, the support shaft 514 is coupled to a casing cover 550 coupled to the casing 530 to secure a position of the screw member 510.

The securing projection 515 and the locking projection 517 are formed on the support shaft 514. The securing projection 515 is formed on an outer circumferential surface of the support shaft 514 at a position spaced apart from another side of the main screw 511 by a predetermined distance.

The securing projection 515 protrudes along a radial direction of the support shaft 514 and is formed along a circumferential direction of the support shaft 514. As will be described in more detail below, the securing projection 515 is coupled to an inner circumferential surface of the casing 530.

The locking projection 517 is formed on the outer circumferential surface of the support shaft 514 at a position spaced apart from the securing projection 515 by a predetermined distance. The locking projection 517 protrudes in the radial direction of the support shaft 514 and is formed along the circumferential direction of the support shaft 514.

As will be described in more detail below, the locking projection 517 is caught by an inner circumferential surface of the casing 530 and prevents the screw member 510 from being separated to either side of the rack bar 200 along the longitudinal direction of the rack bar 200.

The casing 530 prevents the plurality of screw members 510 from being separated from the rack bar 200, while protecting the rack bar 200 and the plurality of screw members 510.

Figure 9:
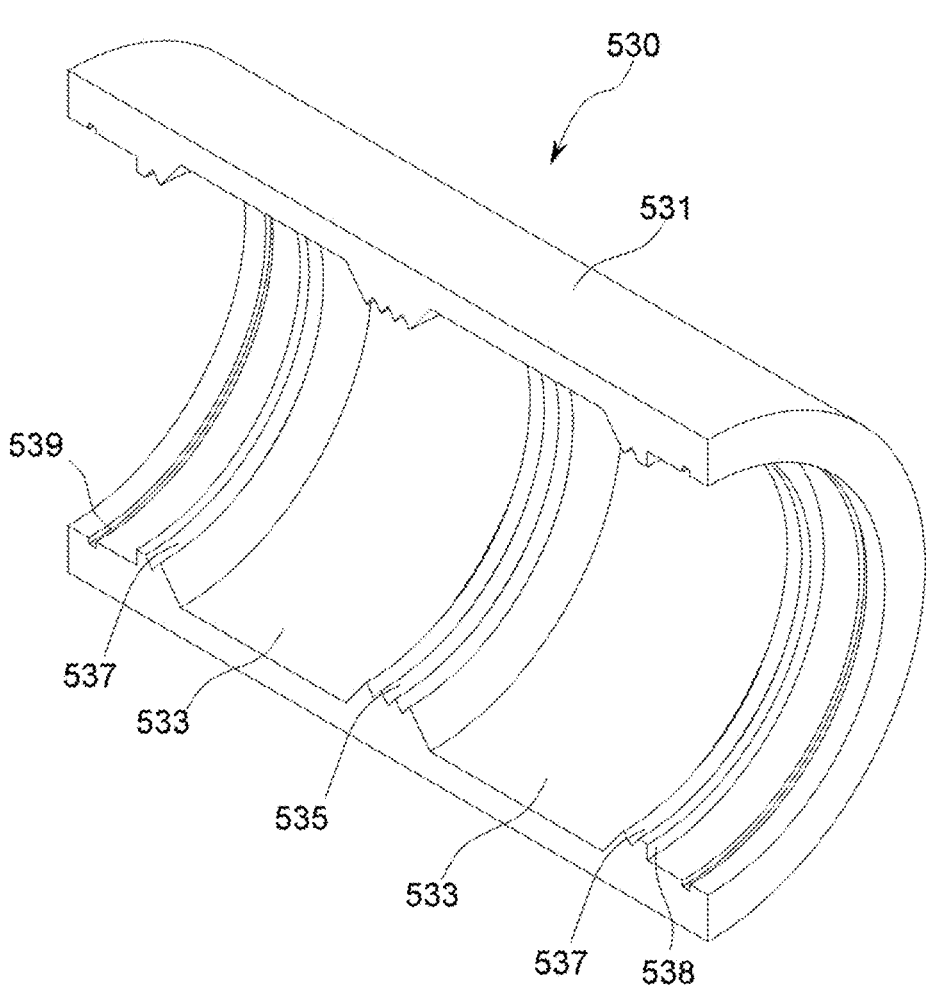
FIG. 9 is a partial perspective view illustrating a casing of the roller screw unit of FIG. 6.

Referring to FIG. 9, the casing 530 includes a cylindrical body 531. A hollow is defined in the body 531 of the casing 530 such that the rack bar 200 and the plurality of screw members 510 may be inserted through the casing 530 along the longitudinal direction.

A positioning recess 533 is defined in an inner circumferential surface of the body 531 of the casing 530 to determine a position of the main screw 511. The positioning recess 533 is radially concave from the inner circumferential surface of the body 531 of the casing 530 and is define along the circumferential direction. A plurality of positioning recesses 533 are spaced apart from each other by a predetermined interval along a longitudinal direction of the casing 530.

As described above, since two main screws 511 are provided in the screw member 510, two positioning recesses 533 are defined while being spaced apart from each other by a predetermined interval along the longitudinal direction of the casing 530.

Figure 6:
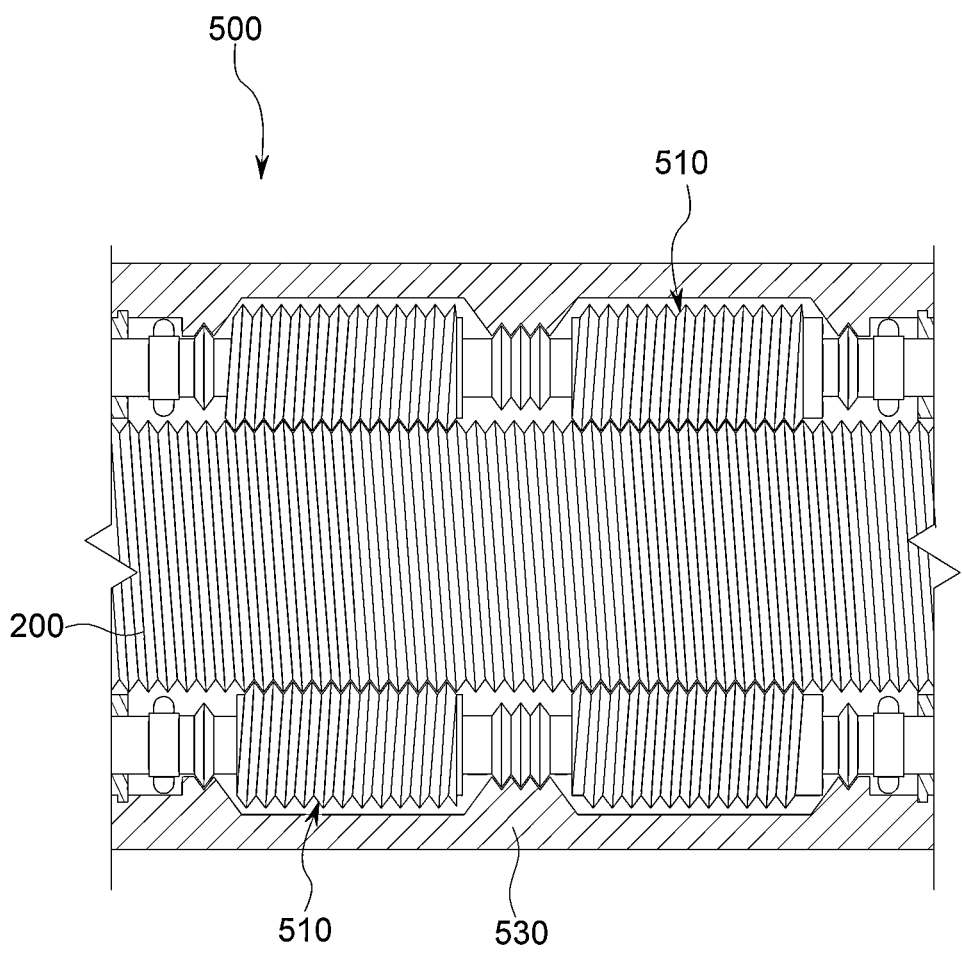
FIG. 6 is a cross-sectional view illustrating a roller screw unit of an electric power steering apparatus according to another embodiment of the present disclosure.
Figure 7:
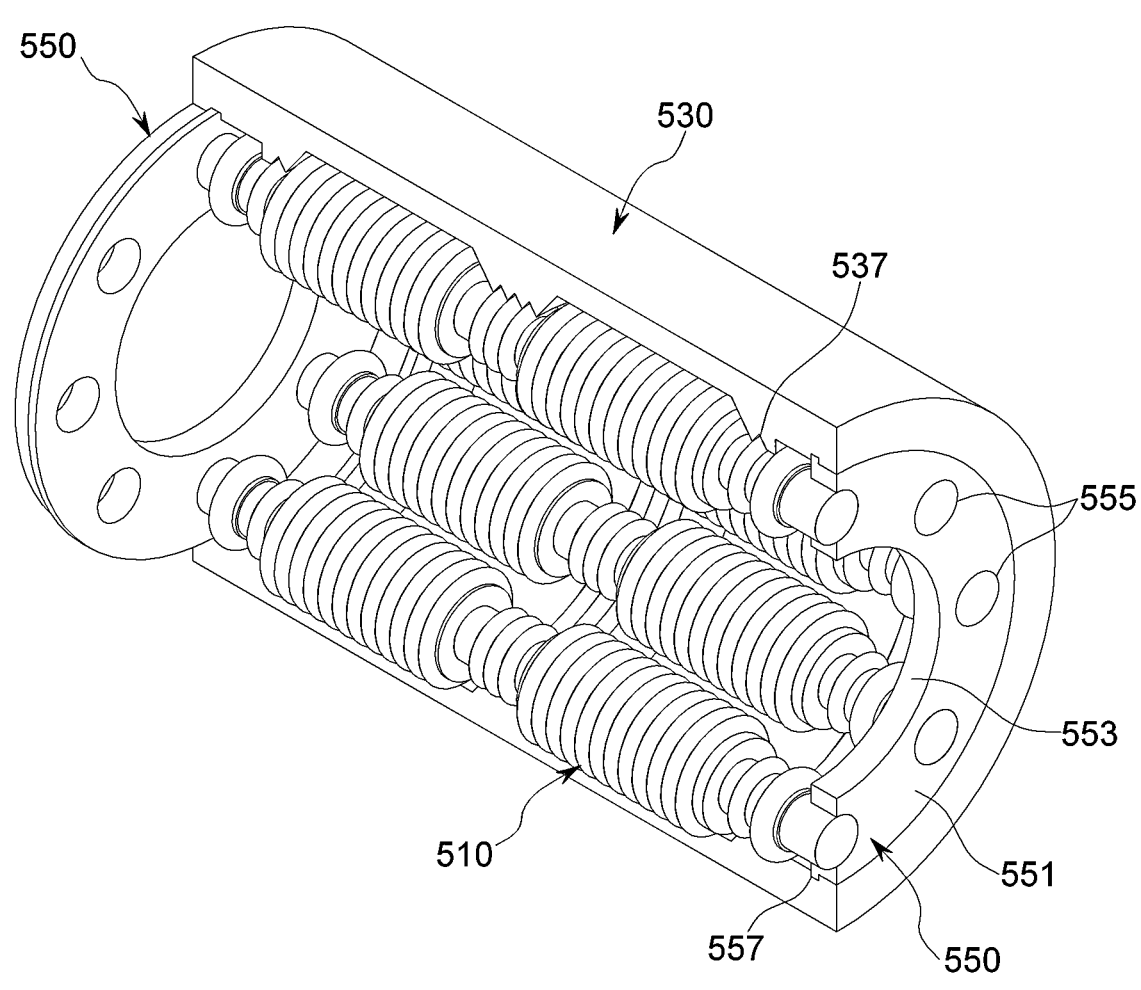
FIG. 7 is a partial perspective view illustrating a portion of the roller screw unit of FIG. 6.

A coupling recess 535 is defined the inner circumferential surface of the body 531 of the casing 530 between two adjacent positioning recesses 533. The coupling recess 535 has a screw thread (not illustrated) defined such that the connection screw 513 may be engaged with the coupling recess 535. Referring to FIG. 6, the main screw 511 does not contact an inner side of the positioning recess 533. If the connection screw 513 is not engaged with the coupling recess 535, the screw member 510 is not secured and the main screw 511 may move and collide with the inside of the positioning recess 533.

However, in the present embodiment, the connection screw 513 is engaged with the coupling recess 535 to secure the screw member 510, such that the main screw 511 may not shake and may be engaged with the first screw recess 210 to be rotatable.

Securing recesses 537 are defined in the inner circumferential surface of the body 531 of the casing 530 at positions spaced a predetermined distance apart from each of the positioning recesses 533 toward opposite ends of the body 531 of the casing 530.

The securing recess 537 is coupled to the securing projection 515. Since the securing projection 513 is coupled to the securing recess 537, the screw member 510 may be prevented from being separated from the casing 530 and moving along the longitudinal direction of the rack bar 200. In addition, together with the coupling of the connection screw 515 and the coupling recess 535, it provides a bearing capacity (e.g., support capacity) such that the screw member 510 may maintain engagement with the first screw recess 210 of the rack bar 200.

An inner circumferential surface of the body 531 of the casing 530 is concave with a predetermined length from each of opposite ends of the body 531 of the casing 530 toward the securing recess 537, thus forming a step 538. As the locking projection 517 is caught by the step 538, the screw member 510 may be prevented from being separated from the casing 530 and prevented from being separated from or moving along the longitudinal direction of the rack bar 200.

In an embodiment, the roller screw unit 500 may further include a casing cover 550. The casing cover 550 is inserted into and coupled to each of longitudinally opposite ends of the casing 530.

The casing cover 550 includes a plate 551 having a circular cross-section, and a hollow 553 is defined in a center portion of the casing cover 550 through which the rack bar 200 may pass. A screw coupling hole 555 is defined at a position spaced apart from the hollow 533 by a predetermined distance in a radial direction. The plurality of screw coupling holes 555 are defined to be spaced apart from each other by a predetermined angle along a circumferential direction.

The plurality of screw coupling holes 555 are located on a substantially same virtual axis as the plurality of screw members 510, respectively. Accordingly, the support shaft 514 of each screw member 510 is inserted into and coupled to each of the screw coupling holes 555. A position of each of the screw members 510 is fixed as the support shaft 514 is inserted into and coupled to the screw coupling hole 555.

A coupling projection 557 is formed on one side of an outer circumferential surface of the casing cover 550. The coupling projection 557 is formed protruding along a radial direction of the casing cover 550 and extending along a circumferential direction of the casing cover 550.

In an embodiment, a coupling projection insertion recess 539 is defined in the casing 530. The coupling projection insertion recess 539 is defined on the inner circumferential surface of the casing 530 and is spaced apart from each of longitudinally opposite sides of the casing 530 by a predetermined distance. The coupling projection insertion recess 539 is concave along the radial direction of the casing 530 and extends along the circumferential direction.

As the coupling projection 557 is inserted into the coupling projection insertion recess 539, the casing cover 550 is coupled to the casing 530.

As described above, when the electric power steering device according to the present disclosure is applied, the screw member may be provided in the roller screw unit which transmits the steering assist power of the motor to the rack bar, such that the screw member may be engaged with the first screw thread of the rack bar with a uniform and high grip force. Accordingly, the bearing capacity, durability and precision may be improved.

In particular, when the bearing capacity is improved and uniform, the effect of suppressing the noise between the rack bar and the roller screw unit may be expected.

As such, as the first screw thread of the rack bar and the screw member are coupled to each other in a screw manner, a distance of the reciprocating motion of the rack bar may be more precisely controlled, and the effect of precise control may be further improved by adjusting a pitch interval between the first screw thread and the screw member.

Although the embodiments of the present disclosure have been described above with reference to the accompanying drawings, those skilled in the art to which the present disclosure pertains may understand that the present disclosure may be embodied in other specific forms without departing from the technical spirit or essential characteristics thereof.

Accordingly, the embodiments described above are to be understood as illustrative and not restrictive in all respects, and the scope of the present disclosure is indicated by the following claims, and from the meaning and scope of the claims and their equivalents. All derived changes or modifications should be construed as being included in the scope of the present disclosure.

REFERENCE NUMERAL

1: Steering wheel 3: Steering shaft
100: Pinion shaft 200: Rack bar
210: First screw recess 250: Rack housing
300: Motor 310: Motor shaft
400, 500: Roller screw unit 410, 510: Screw member
430: Positioning member 450: Housing
530: Casing 550: Casing cover

What is claimed is:

1. An electric power steering apparatus comprising:

a pinion shaft connected to a steering shaft coupled to a steering wheel, the pinion shaft being configured to transmit an operation of the steering wheel by a driver;

a rack bar elongated along a lateral direction of a vehicle, having a first screw recess defined with a predetermined length in a portion of an outer circumferential surface of the rack bar, and comprising, on one side, a rack gear coupled to and interlocked with the pinion shaft;

a motor configured to generate a steering assist power in proportion to a steering torque applied to the steering wheel; and a roller screw unit rotatably engaged with and coupled to the first screw recess to transmit the steering assist power generated from the motor to the rack bar, wherein the roller screw unit comprises:

a plurality of screw members rotatably engaged with the first screw recess and are spaced apart from each other by a predetermined angle along a circumferential direction of the rack bar;

a positioning member having a hollow defined along a longitudinal direction such that the rack bar is insertable through the positioning member, the positioning member being configured to fix a position of the screw members such that the screw members are rotatable only at a predetermined position; and a housing having a hollow defined along a longitudinal direction such that the positioning member and the rack bar are insertable through the housing, the housing being configured to protect the plurality of screw members and the positioning member and prevent the plurality of screw members from being separated from the positioning member, wherein in a body of the positioning member, a positioning hole is defined through inner and outer surfaces of the body, and the positioning hole comprises a plurality of positioning holes spaced apart from each other by a predetermined angle along a circumferential direction of the body, wherein when the rack bar and the positioning member are coupled to each other, the first screw recess is exposed, and the screw members are respectively disposed at the positioning holes such that the first screw recess and the screw members are engaged.

2. The electric power steering apparatus of claim 1, wherein in the body of the positioning member, a separation prevention projection radially protruding from the body of the positioning member is formed between one of the positioning holes and another adjacent one of the positioning holes, and after the screw members are respectively disposed in the positioning holes, the separation prevention projection prevents the screw members from being separated to another place.

3. The electric power steering apparatus of claim 1, wherein a separation prevention ring configured to prevent the screw members disposed in the positioning hole from being separated in a longitudinal direction of the rack bar is further formed extending on longitudinally opposite ends of the body of the positioning member.

4. An electric power steering apparatus comprising:

a pinion shaft connected to a steering shaft coupled to a steering wheel, the pinion shaft being configured to transmit an operation of the steering wheel by a driver;

a rack bar elongated along a lateral direction of a vehicle, having a first screw recess defined with a predetermined length in a portion of an outer circumferential surface of the rack bar, and comprising, on one side, a rack gear coupled to and interlocked with the pinion shaft;

a motor configured to generate a steering assist power in proportion to a steering torque applied to the steering wheel; and a roller screw unit rotatably engaged with and coupled to the first screw recess to transmit the steering assist power generated from the motor to the rack bar, wherein the roller screw unit comprises:

a plurality of screw members rotatably engaged with the first screw recess, and spaced apart from each other by a predetermined angle along a circumferential direction of the rack bar; and a casing having a hollow defined along a longitudinal direction such that the rack bar and the plurality of screw members are insertable through the casing, the casing being configured to prevent the plurality of the screw members from being separated from the rack bar, while protecting the rack bar and the plurality of screw members, wherein the screw members comprises:

a plurality of main screws rotatably engaged with the first screw recess and spaced apart from each other by a predetermined interval in a longitudinal direction of the rack bar;

a connection screw having one side connected to one of the main screws, and another side connected to another of the main screws; and a support shaft formed at a free end of the main screw disposed on the one side and a free end of the main screw located on the other side.

5. The electric power steering apparatus of claim 4, wherein in an inner circumferential surface of the body of the casing, a plurality of positioning recesses are defined concavely along a radial direction to determine a position of the main screw, and spaced apart from each other by a predetermined interval along a longitudinal direction of the body of the casing.

6. The electric power steering apparatus of claim 5, wherein a coupling recess is defined in an inner circumferential surface of the body of the casing between one of the positioning recesses and another of the positioning recesses in a longitudinal direction of the casing, such that the connection screw is engageable with the coupling recess.

7. The electric power steering apparatus of claim 4, wherein the roller screw unit further comprises:

a casing cover coupled to longitudinally opposite sides of the casing, and coupled to the screw members to secure a position of the screw members such that the screw members is rotatable only at a predetermined position.

8. The electric power steering apparatus of claim 7, wherein a coupling projection is formed on one side of an outer circumferential surface of the casing cover, the coupling projection protruding along a radial direction and extending along a circumferential direction.

9. The electric power steering apparatus of claim 8, wherein in the casing, a coupling projection insertion recess concaved along a radial direction and extending along a circumferential direction is defined in an inner circumferential surface of the casing such that the coupling projection is inserted and coupled to the coupling projection insertion recess, the coupling projection insertion recess being spaced apart from longitudinally opposite sides of the casing by a predetermined distance.

* * * * *